United States Patent [19]

Harless et al.

[11] 4,127,937

[45] Dec. 5, 1978

[54] TOOL FOR CUTTING INSULATION FROM ELECTRICAL CABLES

[75] Inventors: Charles E. Harless, Metropolis; Ward G. Taylor, Vienna, both of Ill.

[73] Assignee: The United States Department of Energy, Washington, D.C.

[21] Appl. No.: 868,637

[22] Filed: Jan. 11, 1978

[51] Int. Cl.² .................. B21F 13/00; B26B 27/00
[52] U.S. Cl. .................................. 30/90.7; 30/91.1; 30/91.2
[58] Field of Search ................. 30/90.6, 90.7, 91.1, 30/91.2

[56] References Cited

U.S. PATENT DOCUMENTS

| | | | |
|---|---|---|---|
| 562,097 | 6/1896 | Rieckel | 30/90.7 |
| 2,363,758 | 11/1944 | Thompson | 30/90.7 |
| 2,903,064 | 9/1959 | Blonder | 30/91.1 |
| 2,970,377 | 2/1961 | Olsen | 30/91.2 |
| 3,169,315 | 2/1965 | Mankovitz | 30/91.2 |

FOREIGN PATENT DOCUMENTS 555009   7/1943   United Kingdom .................. 30/90.7

Primary Examiner—James L. Jones, Jr.
Assistant Examiner—J. T. Zatarga
Attorney, Agent, or Firm—Dean E. Carlson; Stephen D. Hamel; Fred O. Lewis

[57] ABSTRACT

This invention is an efficient hand tool for precisely slitting the sheath of insulation on an electrical cable—e.g., a cable two inches in diameter—in a manner facilitating subsequent peeling or stripping of the insulation. The tool includes a rigid frame which is slidably fitted on an end section of the cable. The frame carries a rigidly affixed handle and an opposed, elongated blade-and-handle assembly. The blade-and-handle assembly is pivotally supported by a bracket which is slidably mounted on the frame for movement toward and away from the cable, thus providing an adjustment for the depth of cut. The blade-and-handle assembly is mountable to the bracket in two pivotable positions. With the assembly mounted in the first position, the tool is turned about the cable to slit the insulation circumferentially. With the assembly mounted in the second position, the tool is drawn along the cable to slit the insulation axially. When cut both circumferentially and axially, the insulation can easily be peeled from the cable.

10 Claims, 5 Drawing Figures

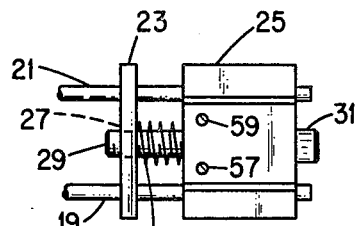
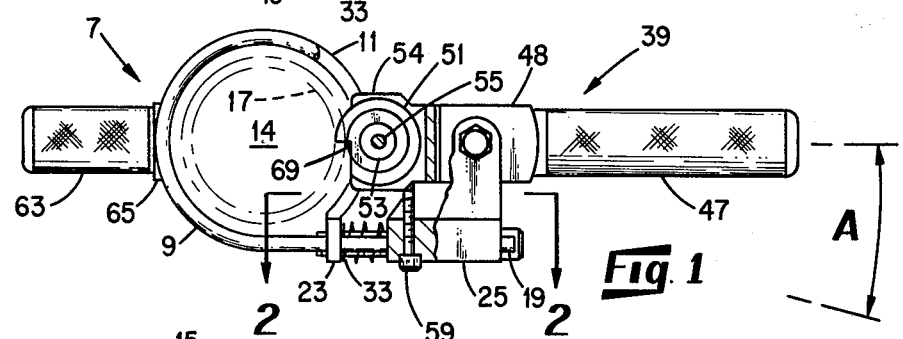
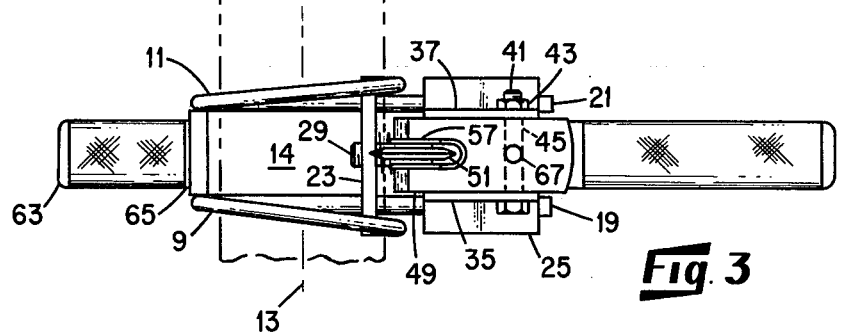
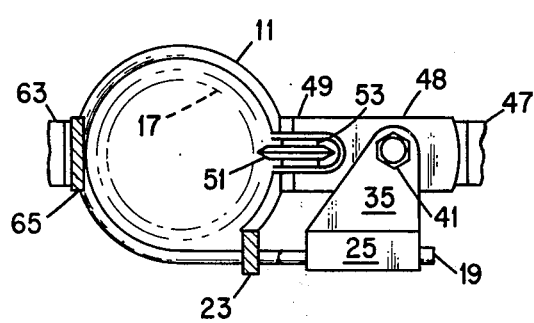
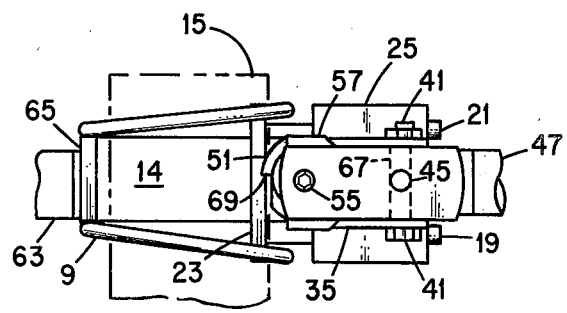

TOOL FOR CUTTING INSULATION FROM ELECTRICAL CABLES

BACKGROUND OF THE INVENTION

This invention was made in the course of, or under, a contract with the United States Department of Energy.

The invention relates generally to tools for slitting the sheath of insulation carried by insulated electrical cables while leaving the electrical conductor intact. More particularly, it relates to a manually operated tool which can be fitted about an insulated electrical cable and used to make axial and circumferential cuts of controlled depth in the cable insulation, thus facilitating subsequent manual removal of the insulation from the cable.

This invention was developed in response to a need for a safe and efficient hand tool which would enable an electrician to bare the ends of insulated cables of relatively large diameter. Conventional wire-stripping tools were not large enough or powerful enough for use with cables having a diameter exceeding about one inch, and slitting the insulation manually with a knife was rejected as hazardous.

OBJECT OF THE INVENTION

Accordingly, it is an object of this invention to provide a novel tool for slitting the sheath of insulation carried by an insulated wire or cable.

It is another object to provide a tool with which an operator can make cuts of controlled depth in cable sheathings composed of rubber, plastic, varnished cambric, lead, and the like.

It is another object to provide a manually operated insulation-slitter of rugged and safe design, for making circumferential and axial cuts in the insulation covering an electrical conductor of relatively large diameter.

Other objects will be made evident hereinafter.

SUMMARY OF THE INVENTION

The invention is summarized as follows: A hand tool for slitting a sheath of insulation encompassing an electrical cable, said tool comprising: a rigid frame including cable-encompassing means defining a region for receiving a section of said cable extending along the axis of said means, said means being provided with a pair of straight arms extending transversely therefrom in side-by-side relation; a bracket slidably mounted to said arms for movement toward and away from said means; a handle carried by said frame for turning said frame about said axis; an insulation-cutting blade carried by and extending axially from said handle; and means for pivotally mounting said handle to said bracket in either of two orientations: (1) a first orientation where pivotal movement of said handle effects arcuate slicing movement of said blade in a plane normal to said axis between a position where said blade is disposed outside said region and another position where said blade extends within said region, and (2) a second orientation where said handle is displaced angularly from said first orientation by approximately 90° and where said handle is pivotally movable in said plane to a position where said blade is coplanar with said axis.

BRIEF DESCRIPTION OF THE DRAWINGS

FIG. 1 is a front view, partly in section, of an insulation-slitter designed in accordance with this invention and positioned to make a circumferential cut in an annular sheath 17 composed of electrically non-conductive material, FIG. 2 is a top view, taken along line 2—2 of FIG. 1, FIG. 3 is a top view of the tool shown in FIG. 1, an insulated electrical cable 15 being shown in dashed lines, FIG. 4 is a partial front view, partly in section, of the tool as assembled to make an axial cut in the sheath 17, and FIG. 5 is a partial top view of the tool shown in FIG. 4.

DESCRIPTION OF THE PREFERRED EMBODIMENT

Referring to FIGS. 1–3, the preferred form of the insulation-slitter 7 includes a rigid frame comprising a pair of similar, spaced loops 9 and 11, which extend about a common axis 13 and which cooperatively define a region 14 (FIGS. 1,3) for accommodating a section of an electric cable. That is, the loops are dimensioned to be slidably fitted about an end section 15 of an electrical cable which is provided with a sheath 17 of insulation. The loops 9, 11 terminate in corresponding, generally parallel extensions 19 and 21, respectively. Each loop, together with its extension, forms a generally "b"-shaped member. The extensions pass through a bar 23, to which they are rigidly attached. As shown, the extensions extend outwardly from the bar and through a base-plate 25, slidably mounted on the extensions. The upper ends of the loops are affixed to the bar 23. The bar is provided with a threaded bore 27 (FIG. 2) for receiving the threaded end of a stud 29, which extends freely through the base-plate and terminates in a cap 31. The stud 20 carries a spring 33 which is mounted in compression between the bar 23 and the base plate, urging the latter outwardly away from the bar 23 and against the cap 31. Thus, the spacing between the base-plate and axis 13 can be varied by turning stud 20. As will be described, adjustment of the stud varies the depth of cut.

Still referring to FIGS. 1–3, the base-plate 25 is provided with spaced uprights 35 and 37, this assembly forming a generally U-shaped bracket. Means (41, 43, 45) are provided for pivotally mounting an elongated blade-and-handle assembly 39 to the bracket. That is, the assembly 39 includes a medial portion 48, which is traversed by a bore 45 for reception of a pivot pin 41 carried by the uprights. The pin is clamped to the uprights by a nut 43. As shown, the assembly 39 includes an outwardly extending handle 47 and an inwardly extending blade-holder 49 (FIG. 3). The assembly is mounted for movement in a plane normal to the axis 13 (FIG. 3) of the frame. As shown, the inner end of the blade-holder is formed with an axial slot for reception of a blade 51 having an arcuate cutting edge. In the illustrated embodiment, the blade approximates a three-quarter segment of a circle, a portion of the outer edge being cut away as shown to form a radial face 69, which is approximately coplanar with the axis of the assembly 39. The hub 53 of the blade fits snugly in the aforementioned slot and is traversed by a screw 55 carried by the blade-holder 49. As indicated in FIG. 3, the blade lies in a plane normal to the axis 13 of the frame. A portion of the edge of the blade extends inwardly, beyond the end of the blade-holder. Preferably, a U-shaped guard 57 for the upper and lower portions of the blade is snugly seated in the slot before installation of the blade.

Referring to FIGS. 1 and 3, movement of the handle 47 about the pivot pin 41 moves the blade-holder 49 (FIG. 3) in an arcuate path in a plane normal to the axis 13 of the frame. As indicated in FIG. 1, adjustable stops 57 and 59 are threaded through the base-plate 23 and extend upwardly thereof to intercept the blade-holder and impose a limit to its downward movement. Upward arcuate movement of the blade-holder 49 is limited to a position where downward movement of the medial portion 48 of the assembly 39 is stopped by the base-plate 25. In the illustrated embodiment, the blade-and-handle assembly is movable through an arc A (FIG. 1). That is, the assembly is movable arcuately between two positions—a first position where the medial portion 48 is in contact with the base-plate 25 and where the blade 51 is disposed outside the region 14, and a second position (FIG. 1) where the assembly is approximately normal to the aforementioned axis 13 of the frame and where the blade extends within the region 14 for a distance determined by the setting of the threaded stud 29.

As shown in FIGS. 1 and 3, the frame carries a rigidly affixed handle 63 which extends in a generally opposite direction from the handle 47 when the latter is positioned normal to the axis 13. The handle 63 is carried by a plate 65, which is welded between the loops 9, 11.

Means are provided for pivotally mounting the blade-and-handle assembly 39 in an alternative position. That is, the medial portion 48 of the assembly 39 is traversed by a bore 67 (FIG. 3) extending normal to the aforementioned bore 45. Bore 67 is provided for mounting the assembly 39 in a position where the blade can be positioned coplanar with the axis 13. This alternative mounting is illustrated in FIGS. 4 and 5, which show the assembly 39 rotated 90° from the position shown in FIGS. 1 and 3, with the pivot pin 41 now extending through the bore 67 and being clamped to the uprights 35, 37. When so mounted, the assembly 39 is pivotable through the aforementioned arc A and between two positions. In the first position, the blade 51 is disposed outside the region 14; in the second position (FIGS. 4 and 5), the blade is substantially co-planar with the axis 13 and extends within the region 14 for a distance determined by the setting of stud 29.

The following is a description of how this tool may be used to slit the polyethylene cover from a cable having a diameter of 2⅜inches. First the assembly 39 is mounted to its support bracket in the position shown in FIGS. 1 and 3. The stud 29 then is adjusted so that when the blade is positioned as shown in FIG. 1, it extends into the region 14 for a distance corresponding to the desired depth of cut. With the assembly 39 in the position where the blade is disposed outside the region 14, the tool is fitted on the cable and moved therealong to the point where the circumferential cut is to be made. The operator then pivots the assembly 39 to the position shown in FIGS. 1 and 3 (i.e., against the stops 57, 59), so that the blade slices the insulation 17, penetrating it to the preset depth. With the blade so positioned, the operator turns the tool 360° counterclockwise (as viewed in FIG. 1) to slit the insulation circumferentially. Without changing the depth-of-cut setting, the operator re-mounts the assembly in the aforementioned alternative position, the arcuate edge of the blade being toward the end of the cable, as illustrated in FIG. 5. The tool now is repositioned along the cable as required to bring the radial face 69 of the blade in line with the circumferential cut. The operator now pivots the holder 49 in the direction forcing the blade into the insulation and simultaneously rotates the cable slightly in the same direction, so that the blade pierces the insulation to the preset depth as the assembly 39 moves against the stops 57, 59 and assumes the position shown in FIG. 4. The operator now slides the tool to the end of the cable, slitting the insulation axially. The intersecting circumferential and axial cuts make it easy for the operator to peel off the insulation. Aligning the radial face 69 as described makes it possible to start the axial cut precisely at the circumferential cut. If desired, the order of the cutting operations may be reversed, with the cable first being cut axially from the point where the circumferential cut is to be made.

The foregoing description has been made for the purpose of illustration, not limitation, and it will be apparent to one versed in the art that various modifications may be made within the scope of the appended claims. For example, the handle-and-blade assembly 39 may be mounted to its support bracket by detents or some other suitable mounting means permitting pivotal movement of the kind described.

What is claimed is:

1. A hand tool for slitting a sheath of insulation encompassing an electrical cable, said tool comprising:
    a rigid frame including cable-encompassing means defining a region for receiving a section of said cable extending along the axis of said means, said means being provided with a pair of straight arms extending transversely therefrom in side-by-side relation;
    a bracket slidably mounted to said arms for movement toward and away from said means;
    a handle carried by said frame for turning said frame about said axis;
    an insulation-cutting blade carried by and extending axially from said handle; and
    means for pivotally mounting said handle to said bracket in either of two orientations: (1) a first orientation where pivotal movement of said handle effects arcuate slicing movement of said blade in a plane normal to said axis between a position where said blade is disposed outside said region and another position where said blade extends within said region, and (2) a second orientation where said handle is displaced angularly from said first orientation by approximately 90° and where said handle is pivotally movable in said plane to a position where said blade is coplanar with said axis.

2. The tool of claim 1 wherein said cable-encompassing means comprises a pair of arcuate members extending about and spaced along said axis.

3. The tool of claim 1 wherein the cutting edge of said blade defines an arc of constant radius.

4. The tool of claim 1 wherein said frame carries means for biasing said bracket in the direction away from said cable-encompassing means.

5. The tool of claim 4 wherein said frame carries adjustable means for limiting the movement of said bracket in said direction.

6. A hand tool for slitting a sheath of insulation carried by an electrical conductor of generally circular cross section, said tool comprising:
    a rigid frame including a pair of correspondingly disposed, generally "b"-shaped members in side-by-side relation, the annular ends of said members having a common axis and cooperatively defining a region for accommodating a section of said cable;

a bracket slidably mounted on the straight end portions of said members for movement toward and away from said annular ends;

a first handle for turning said tool about said axis, said handle being rigidly affixed to said annular members;

a second handle for turning said tool about said axis and carrying an axially extending blade having an edge in the form of a circle-arc, the second handle being pivotally mounted to said bracket for effecting arcuate slicing movement of said blade between a position where said blade is disposed outside said region and a position where said blade extends within said region; means carried by said frame for resiliently biasing said bracket in the direction away from said annular ends; and adjustable means carried by said frame for limiting movement of said bracket in said direction.

7. The tool of claim 6 wherein said bracket is mounted outwardly of a bar which bridges and is rigidly affixed to the straight end portions of said members.

8. The tool of claim 7 wherein said adjustable means is a stud which extends freely through a bore in said bracket, the inner end of said stud being threaded into said bar and the outer end of said stud bearing on an outer face of said bracket.

9. The tool of claim 8 wherein a spring extending about said stud is mounted in compression between said bar and said bracket.

10. The tool of claim 6 wherein the edge of said blade is cut away to form a face which is coplanar with the axis of the second handle.

* * * * *